US011612164B2

(12) United States Patent
Bissell et al.

(10) Patent No.: US 11,612,164 B2
(45) Date of Patent: Mar. 28, 2023

(54) DRIFT REDUCTION ADJUVANT COMPOSITIONS AND METHODS OF USING SAME

(71) Applicant: WINFIELD SOLUTIONS, LLC, Shoreview, MN (US)

(72) Inventors: Daniel C. Bissell, Eagan, MN (US); Danny Brown, Woodbury, MN (US)

(73) Assignee: WinField Solutions, LLC, Arden Hills, MN (US)

( * ) Notice: Subject to any disclaimer, the term of this patent is extended or adjusted under 35 U.S.C. 154(b) by 543 days.

(21) Appl. No.: 15/857,145

(22) Filed: Dec. 28, 2017

(65) Prior Publication Data

US 2018/0184647 A1 Jul. 5, 2018

Related U.S. Application Data

(60) Provisional application No. 62/440,869, filed on Dec. 30, 2016.

(51) Int. Cl.
*A01N 25/02* (2006.01)
*A01N 25/30* (2006.01)
*A01N 25/06* (2006.01)

(52) U.S. Cl.
CPC ............. *A01N 25/02* (2013.01); *A01N 25/06* (2013.01); *A01N 25/30* (2013.01)

(58) Field of Classification Search
CPC ......... A01N 25/02; A01N 25/06; A01N 25/30
See application file for complete search history.

(56) References Cited

U.S. PATENT DOCUMENTS

| | | | | |
|---|---|---|---|---|
| 5,922,649 | A | 7/1999 | Pehu et al. | |
| 6,423,667 | B1 | 7/2002 | Highsmith | |
| 6,797,673 | B1 | 9/2004 | Worthley et al. | |
| 6,890,889 | B1 | 5/2005 | Wichert et al. | |
| 7,666,242 | B2 | 2/2010 | Gednalske et al. | |
| 8,809,234 | B1 * | 8/2014 | Parrish | A01N 25/30 424/1.11 |
| 9,938,201 | B1 | 4/2018 | Scott et al. | |
| 2006/0264328 | A1 | 11/2006 | Modaressi et al. | |
| 2013/0123104 | A1 † | 5/2013 | McKnight | |
| 2013/0324401 | A1 | 12/2013 | Spesard et al. | |
| 2014/0018240 | A1 | 1/2014 | Crosby et al. | |
| 2015/0038442 | A1 | 2/2015 | Van Der Krieken et al. | |
| 2015/0045224 | A1 | 2/2015 | Parrish | |
| 2015/0237851 | A1 | 8/2015 | Drew | |
| 2015/0250165 | A1 | 9/2015 | Balastre et al. | |
| 2016/0165885 | A1 | 6/2016 | Wikeley et al. | |
| 2016/0192649 | A1 | 7/2016 | Lindner | |
| 2016/0227765 | A1 * | 8/2016 | Di Modugno | A01N 25/02 |
| 2016/0360744 | A1 | 12/2016 | Magidow et al. | |
| 2017/0113978 | A1 | 4/2017 | Wheeler et al. | |
| 2017/0127668 | A1 | 5/2017 | Berg et al. | |
| 2019/0037836 | A1 | 2/2019 | Bissell et al. | |

FOREIGN PATENT DOCUMENTS

| | | | |
|---|---|---|---|
| AU | 2013206347 | A1 | 1/2014 |
| CN | 104250419 | A | 12/2014 |
| CN | 105191974 | A | 12/2015 |
| CN | 108294043 | A | 7/2018 |
| CN | 108402034 | A | 8/2018 |
| JP | 2005112792 | A | 4/2005 |
| WO | 0219823 | A2 | 3/2002 |
| WO | 2006065815 | A1 | 6/2006 |
| WO | 2006133788 | A1 | 12/2006 |
| WO | 2008069990 | A1 | 6/2008 |
| WO | 2009002810 | A1 | 12/2008 |
| WO | 2010001184 | A1 | 1/2010 |
| WO | 2011046374 | A2 | 4/2011 |
| WO | 2011065831 | A2 | 6/2011 |
| WO | 2012018885 | A1 | 2/2012 |
| WO | 2012177851 | A1 | 12/2012 |
| WO | 2013181090 | A2 | 12/2013 |
| WO | 2015023434 | A1 | 2/2015 |
| WO | 2015175719 | A1 | 11/2015 |
| WO | 2018126017 | A1 | 7/2018 |

OTHER PUBLICATIONS

PCT, "International Search Report and Written Opinion", Application No. PCT/US2019/040002, dated Sep. 12, 2019, 13 pages.
International Search Report and Written Opinion dated Mar. 11, 2018, for International Application No. PCT/US2017/068729, 12 pages.
"AG 16098 DV 5-8135 Safety Data Sheet", Solvay, Apr. 26, 2016, 14 pages.
"AG-RHOSPEC 7713 Material Safety Data Sheet", Sep. 13, 2013, 10 pages.
"AG-RHOSPEC 7713 Regulatory Profile Sheet", Apr. 3, 2012, 1 page.
"AG-RHOSPEC® 7713 Product Data Sheet N002372", Aug. 2012, 1 page.
"Contact Angle and Drave's Wetting Report for DV 5-8135", NA Agro Lab, May 23, 2016, 6 pages.
"DV 5-8135 Physical Property, Compatibility and DRT Data Report", NA Agro Lab, Solvay Bristol R&I May 6, 2016, 10 pages.

(Continued)

*Primary Examiner* — Robert S Cabral
(74) *Attorney, Agent, or Firm* — Dorsey & Whitney LLP

(57) ABSTRACT

Drift reduction adjuvant composition and agricultural sprays containing such agricultural compositions contain water, a Newtonian responding polymer such as guar gum, an emulsifier such as a polyoxyethylene sorbitan emulsifier, and an oil. When the agricultural spray containing the drift reduction adjuvant composition and a pesticide is delivered from an agricultural nozzle, it produces fewer droplets less than 150 μm in diameter and either reduces, maintains or increases (e.g., by up to 30 percentage points) the number of ultra-coarse droplets above 622 μm in diameter compared to an agricultural spray of the pesticide without the drift reduction adjuvant composition sprayed under the same conditions.

13 Claims, No Drawings

(56) References Cited

OTHER PUBLICATIONS

"HALT Product Label", downloaded from https://s3-us-west-2.amazonaws.com/greenbook-assets/L111240.pdf on Feb. 28, 2018, 1 page.
"HALT Safety Data Sheet, Ag Spray, Inc.", Apr. 28, 2016, 5 pages.
"Interlock by WinField Safety Data Sheet", Oct. 1, 2013, 5 pages.
"Interlock Product Data Sheet by WinField", 2012, 2 pages.
"Preference® Adjuvant Product Data Sheet", Winfield Solutions, LLC, 2 pages.
"What you need to know about Spray Adjuvants", downloaded from www.smbsc.com/pdf/SprayAdjuvants.pdf on Feb. 28, 2018, 5 pages.
Davis, Jason A. et al., "Mitigating Pesticide Spray Drift", University of Arkansas, Agriculture and Nature Resources, FSA2179, May 2015, 6 pages.
Halecky, Alan et al , "Evaluation of a Modified Guar OD Formulation for Spray Drift Mitigation", Journal of ASTM International, Aug. 31, 2011, 8.10:1-13.
Stevens, Peter J., "Adhesion of Spray Droplet to Foliage: The Role of Dynamic Surface Tension and Advantages of Organosilicone Surfactants", Pestic. Sci. 38, 1993, pp. 237-245.
Yarveicy, Hamidreza et al., "Effect of amphoteric surfactant on phase behavior of hydrocarbon-electrolyte-water system—an application in enhanced oil recovery", Journal of Dispersion Science and Technology; vol. 39, No. 4, 2018, pp. 522-530.
Yuan, et al., "Predicting the Temperature Dependent Viscosity of Biodiesel Fuels", Fuel, vol. 88, pp. 1120-1126, 2009, Elsevier.
"Kixor Herbicide", Notice of Pesticide Registration, U.S. Environmental Protection Agency, Jan. 21, 2011, 22 pages, BASF Corporation.
Castro , et al., "Advances in Surfactants for Agrochemicals", Environ Chem Lett, vol. 12, pp. 85-95, 2014, Springer.
Halecky, A., Roberts, J., Penfield, K., and Baker, T."Evaluation of a Modified Guar OD Formulation for Spray Drift Mitigation," Journal of ASTM International, vol. 8, No. 10, 2011, pp. 1-13, http://www.astm.org, ISSN 1546-962X.†

* cited by examiner
† cited by third party

DRIFT REDUCTION ADJUVANT COMPOSITIONS AND METHODS OF USING SAME

CROSS-REFERENCE TO RELATED APPLICATIONS

This application claims the benefit of U.S. Provisional Application No. 62/440,869, filed Dec. 30, 2016.

TECHNICAL FIELD

The present disclosure relates to products, systems and methods of using adjuvant compositions in agricultural spray applications, and more particularly, to drift reduction adjuvants for such applications.

BACKGROUND

Crop protection and cultivation practices commonly involve the application of agricultural sprays. These sprays may contain a variety of components including pesticides for combatting pests such as insects, weeds, and fungus. However, these pesticides can cause environmental problems when the agricultural spray experiences drift and fails to reach the intended target. This has raised an increasing level of concern about pest control costs and environmental pollution associated with agricultural sprays. As a result, application of such sprays requires precision and care. Considerable research on spray drift has been conducted, but it remains a major problem associated with many agricultural spray applications. Consequently, there is a need to provide drift reduction technologies for use with agricultural sprays.

SUMMARY

In view of the foregoing, implementations provide drift reduction adjuvant compositions that may be admixed with agricultural sprays to reduce both the number of fines and the number of ultra-ultra-coarse droplets exiting the sprayer.

According to certain implementations, a drift reduction adjuvant composition includes water; guar gum; a polyoxyethylene sorbitan emulsifier; and a seed oil.

In other implementations, an agricultural spray includes a drift reduction adjuvant containing water, guar gum, an emulsifier comprising a polyoxyethylene sorbitan fatty acid ester, and one or more of a seed oil or a vegetable oil, along with a pesticide. When the agricultural spray is delivered from an agricultural nozzle, it produces fewer droplets less than 150 μm in diameter and either reduces, maintains or increases by up to 15 percentage points the number of ultra-coarse droplets above 622 μm in diameter compared to an agricultural spray of the pesticide without the adjuvant composition sprayed under the same conditions.

In various implementations and alternatives, the polyoxyethylene sorbitan emulsifier may include one or more of: polyoxyethylene sorbitan fatty acid ester, polyoxyethylene 20 sorbital trioleate, polyoxyethylene sorbitan mixed fatty acid ester, polyoxyethylene sorbitan monolaurate, polyoxyethylene sorbitan monooleate, polyoxyethylene sorbitan monopalmitate, polyoxyethylene sorbitan monostearate, polyoxyethylene sorbitan monotallate, polyoxyethylene sorbitol hexaoleate, polyoxyethylene sorbitol oleate-laurate, polyoxyethylene sorbitol penta tall oil ester (40 moles), polyoxyethylene sorbitol tetraoleate, or polyoxyethylene sorbitol, mixed ethyl ester.

In various implementations and alternatives, the seed oil may include modified seed oil ("MSO"). For instance, the MSO may include one or more of modified soybean oil, modified palm oil or modified rapeseed oil.

In various implementations and alternatives, the guar gum may form about 1 to about 6% (v/v) of the adjuvant, or about 0.0045% (v/v) to about 0.032% (v/v) of the spray.

In various implementations and alternatives, the seed oil or vegetable oil may form about 20 to about 40% (v/v) of the adjuvant or about 0.04% (v/v) to 0.8% (v/v) of the spray.

In various implementations and alternatives, the polyoxyethylene sorbitan emulsifier or the emulsifier including a polyoxyethylene sorbitan fatty acid ester may form up to about 3.2% (v/v) of the adjuvant or up to about 0.04% (v/v) of the spray.

In various implementations and alternatives, the agricultural nozzle is configured to produce a flat fan spray.

In various implementations and alternatives, a pH of the spray is about 5 to about 7 and/or the pesticide of the spray comprises a herbicide.

In various implementations and alternatives, the agricultural spray delivered from the agricultural nozzle either reduces, maintains or increases by up to 13 percentage points the number of ultra-coarse droplets above 622 μm in diameter compared to an agricultural spray of the pesticide without the adjuvant composition sprayed under the same conditions.

DETAILED DESCRIPTION

Flat fan sprays, the most common spray class in agricultural applications, are dominated by two atomization mechanisms within this regime: the wave instability and perforation approaches. For the wave instability approach, ligament formation may be produced by aerodynamically-induced wave instabilities. These instabilities grow to generate wave fronts within the fluid sheet region just downstream of the nozzle outlet of the flat-fan spray. These wave fronts form continuous thick and thin bands that extend the fluid sheet region farther downstream from the nozzle. The thin bands eventually collapse, forming ligaments from the thick bands, which in turn collapse into droplets. Alternatively, in the perforation approach, the fluid sheet region of the flat-fan spray may perforate, generating voids within the sheet which grow to form a web-like structure of ligaments. This ligament structure eventually continues to collapse into droplets. Regardless of the atomization mechanism for these flat fan nozzles, a wide geometric spectrum of droplet sizes is produced.

Within agricultural field applications, regardless of the atomization process or nozzle, disadvantageous spray attributes exist. Often, small droplets are produced which are susceptible to off-target drift. Drifting small droplets (e.g., v150 or driftable fine droplets <150 μm) can deposit on unintended plant surfaces causing injury or harm to the vegetation. Furthermore, traditional measures of reducing the spray volume composition of small droplets, by way of nozzle design or chemical adjuvant additive, often increases the volume composition of extra-large droplets (e.g., v622 or ultra-coarse droplets >622 μm). Significantly high rates of ultra-coarse droplets having a diameter greater than 622 μm ("ultra-coarse droplets") diminishes the area coverage of the agrochemical pesticide product. Reduced area coverage has been linked reduced efficacy of the product performance, and the evolution of chemical-resistance in commonly-treated weed species. In either case, significant quantities of small or large droplets within the spray volume can hinder the performance of the applied agrochemical products.

For instance, in prior approaches, rheology modifying polymers, such as guar gum, would tend to produce an increased level of ultra-coarse droplets when combined with an agricultural composition and sprayed. However, the increased level of ultra-coarse droplets produced by the addition of this polymer can result in a non-efficacious sprays. In addition, in prior approaches, the use of oils, such as seed oils, in combination with an emulsifier provided adjuvants targeted for reducing the number of fine droplets without thickening the spray. When attempting to reduce ultra-coarse droplets by using these adjuvants, it further has been found that the sprayed compositions tend to produce fine droplets. Consequently, even spraying compositions where fine droplets should be reduced, whether the reduction is from the nozzle or from the adjuvant in the sprayed composition, attempting to reduce the level of ultra-coarse droplets resulted in producing fines.

Due to these challenges, there is great complexity and difficulty in producing sprays with a narrowed and desirable size distribution, where the volume composition of fine droplets are reduced, while the volume composition of ultra-coarse droplets are also managed. These challenges are addressed herein by the disclosed drift reduction adjuvant compositions containing spray atomization modifiers that simultaneously target the two described approaches to the formation of spray droplets.

I. Drift Reduction Adjuvant Compositions

According to implementations, drift reduction adjuvant compositions comprise atomization modifiers for modifying the formation of droplets produced through both the wave instability approach and the perforation approach. Atomization modifiers include at least one rheology modifier and at least one perforation-aid type adjuvant (e.g., oil or polymer combined with at least one emulsifier). The rheology modifier is included in the adjuvant composition for targeting the wave instability approach to droplet formation. The rheology modifier can include a polymer, such as guar gum. The rheology modifier is combined with a perforation-aid type adjuvant for targeting the perforation approach to droplet formation. By combining these adjuvant components with an agricultural composition, it has been discovered that the sprayed composition produces less fines while managing the level of ultra-coarse droplets.

For example, drift reduction adjuvant compositions that include guar gum without a perforation-aid type adjuvant can reduce the number of fine droplets having a diameter less than 150 μm ("fine droplets") in an agricultural spray compared to a substantially similar agricultural spray that does not include the guar gum. However, the drift reduction adjuvant compositions that include guar gum without a perforation-aid type adjuvant can increase the number of ultra-coarse droplets in an agricultural spray compared to a substantially similar agricultural spray that does not include the guar gum. It has been found, however, that drift reduction adjuvant compositions that include guar gum in combination with a perforation-aid type adjuvant can reduce the number of fine droplets and decrease the number of ultra-coarse droplets in an agricultural spray compared to a substantially similar agricultural spray that does not include the drift reduction adjuvant compositions. For example, drift reduction adjuvant compositions that include guar gum in combination with the perforation-aid type adjuvants can either reduce, maintain, or slightly increase the number of fine droplets in an agricultural spray compared to a substantially similar agricultural spray that does not include the perforation-aid type adjuvant. Additionally, the drift reduction adjuvant compositions that include guar gum in combination with the perforation-aid type adjuvant manages (e.g., reduces, maintains, or increases) the number of ultra-coarse droplets in an agricultural spray compared to a substantially similar agricultural spray that does not include the perforation-aid type adjuvant. As such, the perforation-aid type adjuvant interacts with the guar gum to improve the efficacy of drift reduction adjuvant compositions. Tables 1-6, discussed in more detail below, demonstrate the improved efficacy of agricultural sprays that include drift reduction adjuvant compositions that include both guar gum and the perforation-aid type adjuvant compared to a substantially similar agricultural spray that do not include at least one of the guar gum or the perforation-aid type adjuvant.

It has been found that some perforation-aid type adjuvants, in combination with the guar gum, form drift reduction adjuvant compositions that are more effective at reducing the number of fine droplets and/or managing the number of ultra-coarse droplets. For example, it has been found that drift reduction adjuvant compositions that include MSO in combination with guar gum can be more efficacious at reducing the number of fine droplets and/or managing the number of ultra-coarse droplets than drift reduction adjuvant compositions that include other perforation-aid type adjuvants. For instance, Tables 1-6 provide several compositions of drift reduction adjuvant compositions that include guar gum in combination with MSO and drift reduction adjuvant compositions that include guar gum in combination with other perforation-aid type adjuvants. Tables 1-6 demonstrate that drift reduction adjuvant compositions that include guar gum in combination with MSO are more likely to reduce, maintain, or only slightly increase the number of fine droplets or better manage the number of ultra-coarse droplets compared to drift reduction adjuvant compositions that include guar gum and other perforation-aid type adjuvants.

a. Atomization Modifiers (Wave Instability Approach):

The atomization modifiers for modifying the wave instability approach of droplet formation, according to the present disclosure, include rheology modifiers. Rheology modifiers may include but are not limited to: polymers, Newtonian-responding polymers, monosaccharides, polysaccharides (e.g., colloidal polysaccharides, starches, vegetable gums, pectin), glucose, fructose, galactose, mannose, lactose, fructose, xylose, amylose, raffinose, maltotriose, glucosides, trehalose, saccharide alcohols (e.g., mannitol, sorbitol, xylitol and maltitol), compositions containing sugar such (e.g., molasses and honey), guar gum (e.g., crop-based guar gum), xanthan, cellulose, Locust bean, alginate, agar-agar, carrageenan, gum arabic, dimethylpolysiloxane, and derivatives of and combinations thereof. In a more particular example, the rheology modifier includes guar gum since guar gum combined with a perforation-aid type adjuvant is more effective at reducing the number of fine droplets and managing the number of coarse droplets compared to at least some of the other rheology modifiers disclosed herein. Newtonian polymers can be characterized by a single coefficient of viscosity for a range of shearing or temperature conditions. Traditionally, the viscosity will not significantly change with the rate of applied shear force. Newtonian-responding rheology modifiers may include but are not limited to guar gum, glycerol and/or paraffin waxes or oils.

With respect to the drift reduction adjuvant composition (e.g., an in-can adjuvant product), the rheology modifier may be present in a range from about 1.0 to about 6.0% (v/v), about 1.0 to about 5.0% (v/v), about 1.0 to about 4.0% (v/v), about 1.0 to about 3.5% (v/v), or about 1.0 to about 3.25% (v/v), about 1.0 to about 3.0% (v/v), about 1.0 to about 2.75% (v/v), about 1.25 to about 4.5% (v/v), about 1.5 to about 4.0% (v/v), about 2.0 to about 4.0% (v/v), about 2.0 to about 4.0% (v/v), up to about 6% (v/v), up to about 5.0% (v/v), up to about 4.0% (v/v), up to about 3.5% (v/v), or up to about 3.0% (v/v) of the adjuvant. Alternatively, the rheology modifier may be present in the drift reduction adjuvant composition at any integer range of the aforementioned levels, e.g., about 1.25 to about 2.75% (v/v) of the drift reduction adjuvant composition. With respect to drift reduction adjuvant composition including the, the rheology modifier may be present in a range from about 0.01 to about 0.08 g/ml, about 0.01 to about 0.065 g/ml, about 0.01 to about 0.06 g/ml, about 0.01 to about 0.05 g/ml, about 0.01 to about 0.04 g/m. about 0.01 to about 0.03 g/ml, about 0.02 to about 0.04 g/ml, about 0.03 to about 0.05, about 0.04 to about 0.06, or about 0.05 to about 0.075.

In an embodiment, with respect to agricultural sprays including the rheology modifier-containing adjuvant product (e.g., tank-mixed), the rheology modifier may be present in a range from about 0.0045 to about 0.040% (v/v), about 0.0045 to about 0.036% (v/v), about 0.0045 to about 0.032% (v/v), about 0.006 to about 0.030% (v/v), about 0.008 to about 0.025% (v/v), about 0.009 to about 0.020% (v/v), about 0.009 to about 0.016% (v/v), about 0.009 to about 0.014% (v/v), about 0.009 to about 0.013% (v/v), about 0.009 to about 0.011% (v/v), up to about 0.040% (v/v), up to about 0.035% (v/v), up to about 0.032% (v/v), up to about 0.030% (v/v), up to about 0.025% (v/v), up to about 0.020% (v/v), or up to about 0.016% (v/v) of the agricultural spray. Alternatively, the rheology modifier may be present in the spray at any integer range of the aforementioned levels, e.g., about 0.009 to about 0.032 (v/v) of the spray. With respect to agricultural sprays including the rheology modifier-containing adjuvant product, the rheology modifier may be present in a range from about $0.7\times10^{-4}$ to about $5\times10^{-4}$ g/ml, about $1.0\times10^{-4}$ to about $1.4\times10^{-4}$ g/ml, about $1.2\times10^{-4}$ to about $1.5\times10^{-4}$ g/ml, about $1.4\times10^{-4}$ to about $1.7\times10^{-4}$ g/ml, about $1.5\times10^{-4}$ to about $2.0\times10^{-4}$ g/ml, about $1.7\times10^{-4}$ to about $2.2\times10^{-4}$ g/ml, about $2.0\times10^{-4}$ to about $2.6\times10^{-4}$ g/ml, $2.2\times10^{-4}$ to about $2.7\times10^{-4}$ g/ml, or about 2.6 $10^{-4}$ to about $3\times10^{-4}$ g/ml of the agricultural spray.

The amount of the rheology modifier (e.g., guar gum) in a drift reduction adjuvant composition or agricultural spray can be selected to at least one of reduce the number of fine droplets and/or manage the number of the ultra-coarse droplets. As such, the amount of the rheology modifier can be selected based on the desired number of fine droplets and/or ultra-coarse droplets. Typically, increasing the amount of the rheology modifier decreases the number of fine droplets and increases the number of ultra-coarse droplets. The amount of the rheology modifier can also be selected based on the amount of the perforation-aid type adjuvant that mixed with the rheology modifier. For example, typically, increasing the amount of the perforation-aid type adjuvant decreases the number of ultra-coarse droplets thereby allowing for an increased amount of the rheology modifier. However, as shown in Tables 1-6, the rheology modifier in combination with the perforation-aid type adjuvant can have certain compositions (e.g., sweet spots) where increasing or decreasing the amount of the rheology modifier and/or the perforation-aid type adjuvant can increase the number of fine droplets and/or the number of ultra-coarse droplets. Additionally, the amount of the rheology modifier can be selected based on the type of agricultural nozzle used to spray the drift reduction adjuvant composition or agricultural spray and the type of pesticide that is mixed with the drift reduction adjuvant composition (see Tables 2, 3, and 5).

b. Atomization Modifiers (Perforation Approach):

The atomization modifiers for modifying the sheet perforation mechanism for droplet formation may include at least one perforation-aid type adjuvant. The perforation-aid type adjuvant can include at least one oil and/or a polymer solution along with an emulsifier.

Oils that may be included in the adjuvant composition of the present disclosure may include but are not limited to: vegetable oil, modified vegetable oil, seed oil, MSO, modified soybean oil (e.g., soybean oil methyl ester, methyl soyate)), modified palm oil, modified rapeseed oil, crop oil concentrate, petroleum hydrocarbons, mineral oil, paraffinic oil, naphthenic oil, aromatic oil, emulsified petroleum distillates, unsaturated fatty acids, paraffin oil, tall oil (e.g., fatty acids of tall oil), phytoblend-based oil, tallow oil (e.g., tallow fatty acid amine ethoxylated). Modified oils may include oils that are, for instance, methylated, ethylated, propylated, or butylated.

Polymers may be included in the adjuvant composition of the present disclosure, and may be used to supplement or substitute the oils provided herein. The polymers may include but are not limited to: suspended latex, poly(ethylene glycol), poly(vinyl alcohol), polyacrylates, polyacrylamide, poly(vinyl acetate-alt-maleic anhydride), polylactic acid, polyhydroxyalkanoates, and/or polyoxyalkylenes.

With respect to the drift reduction adjuvant composition, the oil, polymer or combinations, may be present in a range from about 20 to about 40% (v/v), about 25 to about to about 40% (v/v), about 25 to about to about 35% (v/v), about 30 to about to about 40% (v/v), up to about 35% (v/v), up to about 40% (v/v), or up to about 50% (v/v) of the adjuvant composition. Alternatively, the oil, polymer or combinations may be present in the adjuvant composition at any integer range of the aforementioned levels, e.g., about 30 to about 35% (v/v) of the adjuvant composition.

With respect to the agricultural spray, the oil, polymer or combinations, may be present in a range from about 0.04% (v/v) to 0.8%((v/v)), about 0.05 to about 0.6% (v/v), about 0.06 to about 0.6% (v/v), about 0.07 to about 0.6% (v/v), or about 0.08 to about 0.4% (v/v), about 0.08 to about 0.4% (v/v), about 0.1 to about 0.4% (v/v), about 0.2 to about 0.4% (v/v), about 0.2 to about 0.8% (v/v), up to about 1.0% (v/v) up to about 0.8% (v/v), up to about 0.7% (v/v), up to about 0.6% (v/v), up to about 0.5% (v/v), or up to about 0.4% (v/v) of the agricultural spray. Alternatively, the oil, polymer or combinations may be present in the spray at any integer range of the aforementioned levels, e.g., about 0.02 to about 0.4% (v/v) of the spray. With respect to the agricultural spray, the oil, polymer or combinations, may be present in a range from about $1\times10^{-5}$ to about $5\times10^{-3}$ g/ml, about $1\times10^{-5}$ to about $5\times10^{-5}$ g/ml, about $2.5\times10^{-5}$ to about $7.5\times10^{-5}$ g/ml, about $5\times10^{-5}$ to about $1\times10^{-4}$ g/ml, about $7.5\times10^{-5}$ to about $2.5\times10^{-4}$ g/ml, about $1\times10^{-4}$ to about $5\times10^{-4}$ g/ml, about $2.5\times10^{-4}$ to about $7.5\times10^{-4}$ g/ml, about $5\times10^{-4}$ to about $1\times10^{-3}$ g/ml, about $7.5\times10^{-4}$ to about $2.5\times10^{-3}$ g/ml, or about $1\times10^{-3}$ to about $5\times10^{-3}$ g/ml.

Emulsifiers in the adjuvant compositions of the present disclosure may promote dispersion in aqueous or oil solutions. These may include but are not limited to: surfactants; non-ionic surfactants; anionic surfactants; cationic surfactants; petroleum oil, tall oil-based surfactants (e.g., fatty acids of tall oil); alkyl phenol ethoxylate; ethoxylated alcohol; lecithin (e.g., soy lecithin); modified alkanoate; alkylphenol ethoxylate phosphate ester; dimethylpolysiloxane, glycerol, alcohol ethoxylate; alkyl polysaccharides; polyoxyethylene sorbitol; polyoxyethylene sorbitan emulsifiers, including polyoxyethylene sorbitan fatty acid esters, polyoxyethylene 20 sorbital trioleate, polyoxyethylene sorbitan mixed fatty acid esters, polyoxyethylene sorbitan monolaurate, polyoxyethylene sorbitan monooleate, polyoxyethylene sorbitan monopalmitate, polyoxyethylene sorbitan monostearate, polyoxyethylene sorbitan monotallate, polyoxyethylene sorbitol hexaoleate, polyoxyethylene sorbitol oleate-laurate, polyoxyethylene sorbitol penta tall oil ester (40 moles), polyoxyethylene sorbitol tetraoleate, and polyoxyethylene sorbitol, mixed ethyl ester, and variations and combinations thereof.

Anionic surfactants may be crop-derived surfactants (e.g., derived from corn and/or rapeseed) configured to emulsify methyl esters, such as C18-C22 methyl esters. The surfactant may be dispersible in water and soluble in organic solvents. Example anionic surfactants include polyoxyethylene sorbitan emulsifiers, including those provided herein, alone or in combination with vegetable oil. In addition or alternatively, other surfactants may include but are not limited to: linear alkylbenzene sulfonate salt, branched alkylbenzene sulfonate, ethoxylated fatty alcohols, ethoxylated castor oil, ethoxylated/propoxylated alcohols and copolymers, ethoxylated fatty acids, sorbitan ester, polysorbate, ethoxylated fatty amine, ethoxylated tristyrylphenol, ethoxylated phosphate esternolamide, ethoxylated nonylphenol, tallow amine ethoxylated, tallow amine, naphthalene sulfonate formaldehyde condensate, alcohol alkoxylate, and tristyrylphenol alkoxylate. The surfactant may optionally contain a solvent such as isobutyl alcohol (CAS #78-83-1) at 5-10% and alkyl benzylsulfonic acid, calcium salt (CAS #84989-14-0) at 10-30% of the surfactant.

Non-ionic surfactants may be crop-derived surfactants, such as commercially available surfactants including but not limited to: Alkyl polysaccharide emulsifiers may be commercially available surfactants and include but are not limited to: Agrimul PG 2069®, available from Henkel Corporation of Ambler, Pa.; APG 325®, available from BASF Corporation of Florham Park, N.J.; and AT Plus 438®, available from Uniqema Surfactant of Wilmington, Del.; APG 911 and APG 810, available from Adjuvants Unlimited. Agrimul PG 2069® is an alkyl polyglycoside non-ionic surfactant and includes alkyl polyglycoside polymers with alkyl chains of nine carbons in a concentration of 20% by weight, ten carbon atoms in a concentration of 40 wt % and eleven carbon atoms in a concentration of 40% wt %. The alkyl polyglycoside, APG 325® has an average degree of polymerization of 1.6, and is considered a non-ionic surfactant. It is non-gelling, biodegradable and soluble in dispersions of high salt concentrations. AT Plus 438® is an alkyl polysaccharide based on glucose and fatty alcohols derived from plant sources.

With respect to the drift reduction adjuvant composition, the emulsifier may be present in a range from about 0.1 to about 3.0% (v/v), about 0.5 to about 2.5% (v/v), about 0.75 to about 2.25% (v/v), about 1.0 to about 2.0% (v/v), up to about 1.5% (v/v), up to about 1.6% (v/v), up to about 2.0% (v/v), up to about 2.5% (v/v), up to about 3.0% (v/v), or up to about 3.2% (v/v) of the drift reduction adjuvant composition. Alternatively, the emulsifier may be present in the drift reduction adjuvant composition at any integer range of the aforementioned levels, e.g., about 2.5 to about 3.2% (v/v) of the drift reduction adjuvant composition.

With respect to the agricultural spray, the emulsifier may be present in a range from about 0.005 to about 0.040% (v/v), about 0.005 to about 0.03% (v/v), about 0.005 to about 0.030% (v/v), about 0.01 to about 0.04% (v/v), about 0.01 to about 0.030% (v/v), about 0.01 to about 0.02% (v/v), about 0.015% (v/v), about or up to about 0.020% (v/v), about or up to about 0.030% (v/v), or about or up to about 0.040% (v/v) of the agricultural spray. Alternatively, the emulsifier may be present in the spray at any integer range of the aforementioned levels, e.g., about 0.02 to about 0.04% (v/v) of the spray.

The amount of the perforation-aid type adjuvant (e.g., MSO) in the drift reduction adjuvant composition or the agricultural spray can be selected to at least one of reduce the number of fine droplets and/or manage the number of the ultra-coarse droplets. As such, the amount of the perforation-aid type adjuvant can be selected based on the desired number of fine droplets and/or ultra-coarse droplets. For example, typically, increasing the amount of the perforation-aid type adjuvant decrease the number of ultra-coarse droplets while increase the number of fine droplets. Additionally, the amount of the perforation-aid type adjuvant can be selected based on the amount of the rheology modifier that is mixed therewith. For example, typically, increasing the amount of the rheology modifier mixed with the perforation-aid type adjuvant decreases the number of fine droplets thereby allowing for an increased amount of the perforation-aid type adjuvant. However, as shown in Tables 1-6, the combination of perforation-aid type adjuvant in combination with the rheology modifier can have certain compositions (e.g., sweet spots) where increasing or decreasing the amount of the perforation-aid type adjuvant and/or the rheology modifier can increase the number of fine droplets and the number of ultra-coarse droplets. Additionally, the amount of the perforation-aid type adjuvant can be selected based on the type of agricultural nozzle used to spray the drift reduction adjuvant and/or the type of pesticide mixed with the drift reduction adjuvant composition (see Tables 2, 3, and 5).

c. Other Components:

Stabilizing agents may be optional in the drift reduction adjuvant composition, and may include: additional surfactants such as linear alkylbenzene sulfonate salt, branched alkylbenzene sulfonate, ethoxylated fatty alcohols, ethoxylated castor oil, ethoxylated/propoxylated alcohols and copolymers, ethoxylated fatty acids, sorbitan ester, polysorbate, ethoxylated fatty amine, ethoxylated tristyrylphenol, ethoxylated phosphate esternolamide, ethoxylated nonylphenol, tallow amine ethoxylated, tallow amine, naphthalene sulfonate formaldehyde condensate, alcohol alkoxylate, and tristyrylphenol alkoxylate. Resins or other polymers may also be included.

The drift reduction adjuvant composition may include inert components that include but are not limited to: solvents (e.g., isopropyl alcohol and/or isobutyl alcohol), propylene glycol, and a poly-siloxane foam retardant (Si). These inert components may be nonfunctioning agents, surfactant additives, and/or formulation aids, e.g., for reducing the freezing temperature. Such inert components may be present in a range from about 1 to about 30% (v/v) of the adjuvant composition. Other inert components may include anti-foaming agents or defoamers, which may be present in the composition and may include but are not limited to silicone-based defoamers. These components may be present in a range from about 0.001 to about 1.0% (v/v) of the drift reduction adjuvant composition. Antimicrobials, another category of inert components, may be present in the drift reduction adjuvant composition and may include is are not limited to 1,2-benzisothiazolin-3-one in dipropylene glycol—antimicrobial (e.g., Proxel™ GXL, available from Arch Biocides of Smyrna, Ga.). These components may be present in a range from about 0.01 to about 0.25% (v/v) of the drift reduction adjuvant composition. In some approaches, additional adjuvants may be included in the drift reduction adjuvant composition or the tank and may include Preference® adjuvant, which contains alkylphenol ethoxylate, sodium salts of soya fatty acids and isopropyl alcohol.

The drift reduction adjuvant compositions and other compositions of the present disclosure containing the drift reduction adjuvant composition may consist exclusively of the specifically recited components. In addition or alternatively, the drift reduction adjuvant compositions may be free of certain components. For instance, the drift reduction adjuvant compositions of the present disclosure may be free of one or more of the described adjuvant components or free of any of the described pesticides or additives. In addition or alternatively, the drift reduction adjuvant compositions may be free of high fructose corn syrup, alginate, lecithin, ammonium sulfate, water conditioning agents, buffering agents, coupling agents and/or antifoam agents. The recited compositions may contain various impurities, but in such amounts so as not to affect the advantageous properties of the inventive drift reduction compositions.

II. Applications of Use

The drift reduction adjuvant compositions may be used in connection with agricultural spray applications such as spraying seeds, soil, foliage and fruit. Sprays containing the disclosed drift reduction adjuvant compositions may be delivered using ground and/or aerial spray applications. Application may be during the vegetative state, during planting, and/or after planting to reduce drift and manage the production of ultra-coarse droplets of the agricultural spray.

In some implementations, the drift reduction adjuvant compositions may be provided as an in-can admixture of at least the two different atomization modifiers. In addition or alternatively, the drift reduction adjuvant composition may be contained in a pesticide or other agricultural mixture for use in spray applications. In alternative implementations, the atomization modifiers may be provided separately and admixed just prior to use. Admixing may be conducted under agitation. In addition or alternatively, admixing may take place at about 33 to about 100° F. or at ambient temperatures, e.g., about 70 to 90° F. depending on climate, or may take place under elevated temperatures above 90° F. The drift reduction adjuvant compositions may have a pH of about 5.5 to about 7.5 about 5.5 to about 6.5 or about 6.5 to about 7.5, or about 5.5, 6.0, 6.5, 7.0, or 7.5.

Prior to use, the disclosed drift reduction adjuvant compositions may be mixed (e.g. tank-mixed) with, for instance, water, water conditioners, pesticides, micronutrients, antimicrobial compositions, and inert components described herein. Admixing may be conducted under agitation. In addition or alternatively, admixing may take place at about 33 to about 100° F. or at ambient temperatures, e.g., about 70 to 90° F. depending on climate, or may take place under elevated temperatures above 90° F. Admixtures containing the drift reduction adjuvant composition and a herbicide may have a pH of about 5 to about 7, or about 5.5 to about 6.5, or about 5.0, 5.5, 6.0, 6.5, or 7.0.

In an embodiment, in use, the agricultural spray may be delivered from an agricultural nozzle in ground applications to produce fewer fine droplets and either reduce, maintain or increase by up to 100 percentage points (e.g., up to 75 percentage points, up to 50 percentage points, up to 25 percentage points, or up to 15 percentage points) the number of ultra-coarse droplets compared to an agricultural spray of the same pesticide but without the drift reduction adjuvant composition delivered under the same conditions, e.g., delivered from the same nozzle at the same pressure and flow rate. With respect to management of the level of ultra-coarse droplets produced, the increase in ultra-coarse droplets by up to 100 percentage points, and more particularly up to 50 percentage points, and more particularly up to 15 percentage points, relative to spraying the herbicide without the drift reduction adjuvant composition is an acceptable increase, as long as the number of fine droplets are simultaneously reduced relative to spraying the herbicide without the drift reduction adjuvant composition. In some implementations, managing the level of ultra-coarse droplets may increase by up to 5, 6, 7, 8, 9, 10, 11, 12, 13 or 14 percentage points while reducing the number of fines produced from the spray as compared to an agricultural spray of the pesticide delivered under the same conditions.

For instance, drift reduction adjuvant compositions including guar gum and MSO drift reduction technology ("DRT") with guar gum at 0.0045% (v/v) to 0.032% (v/v) and MSO DRT at 0.039% (v/v) to 0.782% (v/v), or other ranges and levels disclosed herein, may provide efficacious sprays that reduce fines and control the level of ultra-coarse droplets by up to 100 percentage points, or less, compared to an agricultural spray of the pesticide without the drift reduction adjuvant compositions delivered under the same conditions.

In one example, spraying the drift reduction adjuvant compositions containing guar gum at 0.009% to 0.016% (v/v) and MSO DRT at 0.117% to 0.391% (v/v) in an agricultural spray containing herbicide (such as dicamba and glyphosate) may reduce fines and may either reduce, maintain or increase by up to 13 percentage points the number of ultra-coarse droplets compared to spraying, under the same conditions, an agricultural spray of the same herbicide but without the drift reduction adjuvant composition.

Spraying drift reduction adjuvant compositions of guar gum at 0.009% to 0.02% (v/v) and MSO DRT at 0.078% to 0.391% (v/v) with a pesticide (such as dicamba) may reduce fines and may reduce, maintain or increase by up to 15 percentage points the number of ultra-coarse droplets compared to spraying, under the same conditions, an agricultural spray of the pesticide without the drift reduction adjuvant composition.

In another example, spraying the drift reduction adjuvant compositions of guar gum at 0.009% to 0.011% (v/v) and MSO DRT at 0.156% to 0.273% (v/v) may reduce fines and may only slightly increase the level of ultra-coarse droplets relative to spraying, under the same conditions, a herbicide (such as dicamba and glyphosate) without the DRT adjuvant, and further, this spray may reduce the level of ultra-coarse droplets relative to spraying the same herbicide with guar gum alone as the drift reduction adjuvant composition.

In one particular example, spraying a herbicide (such as dicamba) with the drift reduction adjuvant composition of guar gum at 0.011% (v/v) and MSO DRT at 0.156% to 0.273% (v/v) may reduce fines and may maintain the level of ultra-coarse droplets to a similar level relative to spraying the herbicide without the drift reduction adjuvant composition under the same conditions.

In addition to reducing fines and managing the level of ultra-coarse droplets produced, the drift reduction adjuvant compositions of the present disclosure containing atomization modifiers may produce about the same amount of ultra-coarse droplets compared to spraying the drift reduction adjuvant composition of guar gum with a pesticide (e.g., a herbicide). For example, spraying guar gum at 0.013% to 0.014% (v/v) and MSO DRT at 0.117% to 0.273% (v/v) in combination with a herbicide (such as dicamba and glyphosate) may reduce fines below that produced when spraying, under the same conditions, the same herbicide with guar gum alone as the adjuvant. Such a spray may simultaneously maintain the level of ultra-coarse droplets produced compared to spraying, under the same conditions, the same herbicide and guar gum alone, and further, the level of ultra-coarse droplets may be elevated by 5 percentage points, or fewer, compared to the level of ultra-coarse droplets produced by spraying the herbicide alone under the same conditions.

Spraying drift reduction adjuvant compositions of guar gum at 0.013% to 0.014% (v/v) and MSO DRT at 0.078% to 0.234% (v/v) with a herbicide (such as dicamba) may reduce fines, maintain the level of increased ultra-coarse droplets within 10 percentage points relative to spraying the herbicide without the drift reduction adjuvant compositions under the same conditions, and further, may reduce the level of ultra-coarse droplets relative to spraying, under the same conditions, the herbicide and guar gum alone as the drift reduction adjuvant composition.

Agricultural Nozzles:

The agricultural nozzles that may be used to spray the drift reduction adjuvant composition of the present disclosure may vary in size, shape, material, and other characteristics. Examples of agricultural nozzles that may be used include drift reduction nozzles, such as nozzles that produce flat fan sprays. Agricultural nozzles may include those manufactured by TeeJet (TPI 11004 nozzle, XR11002—XR TeeJet Extended Range Flat Spray Tip, AIXR11004—AIXR TeeJet Spray Tip), Hypro, Greenleaf, Wilger, Lechler, including nozzle models such as AIXR, AI, TT, UCD and so on. While in prior approaches controlling the spray spectrum of agricultural sprays using drift reduction nozzles presented challenges due drift reduction technology adjuvants actually producing fines or an excessive percentage of ultra-coarse droplets when sprayed from these nozzles, the drift reduction adjuvant compositions of the present disclosure produce efficacious sprays when sprayed from these nozzles. The nozzle classifications for the agricultural nozzles that may be used to spray the agricultural compositions include but are not limited to: extremely fine (XF), purple in color, with a VMD of approximately 50 μm; very fine (VF), red in color, with a VMD of <136 μm; fine (F), orange in color, with a VMD of 136-177 μm; medium (M), yellow in color, with a VMD of 177-218 μm; ultra-coarse (C), blue in color, with a VMD of 218-349 μm; very ultra-coarse (VC), green, with a VMD of 349-428 μm; extremely ultra-coarse (EC), white in color, with a VMD of 428-622 μm; and ultra-coarse (UC), black in color, with a VMD of >622 μm.

Example flow rates through the nozzles include about 0.0125 to about 2.0 gallons per minute (gpm) per nozzle. As a specific example, the flow rate of the nozzle may be variable and may range from about 0.2 to about 1.5 gpm per nozzle.

The nozzles may deliver spray at a spray angle of about 65° to about 140°, up to about 140°, about 90°, about 100°, about 110°, about 120°, about 130° or about 140°.

The spray nozzles may be operated at up to 115 psi fluid pressure, or about 15 to about 115 psi, about 30 to about 60 psi fluid pressure, or about 15, about 20, about 30, about 40, about 50, about 60, about 70, about 80, about 90, about 100, about 110 psi fluid pressure, or any integer range of the aforementioned pressure levels (e.g., about 15 to about 60 psi).

It is believed that using any agricultural nozzle with the drift reduction adjuvant compositions disclosed herein that include guar gum in combination with perforation-aid type adjuvants (e.g., MSO DRT) reduces the number of fine droplets and manages the number of ultra-coarse droplets compared to using the agricultural nozzle to spray an agricultural spray without the DRT adjuvants. For example, Table 5 (provided below) demonstrates that the DRT adjuvants disclosed herein produce efficacious sprays with a variety of agricultural nozzles. Additionally, as demonstrated in Table 5, the effectiveness of the DRT adjuvants can vary based on the type of agricultural nozzle.

Pesticides:

A number of pesticides, e.g., herbicides, insecticides and/or fungicides may be used in connection with the drift reduction adjuvant compositions of the present disclosure. Some herbicides include but are not limited to glyphosate (e.g., N-(phosphonomethyl)glycine) in various forms including in the form of a salt, ester or other derivative thereof. Examples of glyphosate products include but are not limited to: its form as a potassium salt (e.g., Roundup PowerMax® and Touchdown Total®), as a dimethylamine salt (e.g., Durango® DMA®), in is form as an isopropylamine salt (e.g., Cornerstone® 5 plus), and glyphosate in combination with other pesticides such as 2,4-Dichlorophenoxyacetic acid (2,4-D) (e.g., Enlist Duo™) and with dicamba (e.g., Mon 76832 and Roundup® Xtend). Other herbicides include, but are not limited to: the sodium salt of bentazon (3-(1-methylethyl)-1H-2, 1,3-benzothiadiazin-4 (3H)-one 2,2,-dioxide) (e.g., Basagran®); diglycolamine salt of 3,6-dichloro-o-anisic acid (e.g., Sterling® Blue); 3,6-dichloro-2-methoxybenzoic acid (e.g., Dicamba, Enginia™); diclycolamine salt of dicamba (e.g., XtendiMAX); 2,4-Dichlorophenoxyacetic acid (2,4-D); 1-chloro-3-ethylamino-5-isopropylamino-2,4,6-triazine (Atrazine); amide herbicides; arsenical herbicides; carbamate and tiocarbamate herbicides; carboxylic acid herbicides; dinitronailine herbicides; heterocyclic nitrogen-containing herbicides; organophosphate compounds; urea herbicides; and quaternary herbicides; 5-[2-chloro-4-(trifluoromethyl)phenoxy]-N-(methylsulfonyl)-2-nitrobenzamide (Fomesafen); tembotrione (e.g., Laudis®) in various forms including in the form of a salt, ester or other derivative thereof.

Weeds that may be controlled using the herbicide compositions may include, but are not limited to: barnyard grass, green foxtail, wild oats, nightshade, velvetleaf, annual morning glory, yellow nutsedge, pigweed, downy brome.

In addition or alternatively, the herbicides may include insecticides and/or fungicides. Insecticides that may be used with the disclosed drift reduction adjuvant compositions include but are not limited to: pyrethroid insecticides (e.g., bifenthrin); pyrethrins or other botanicals (e.g. D-limonene, linalool, ryania, rotenone, eugenol (clove oil); chloronicotinyls; essential oils (e.g., lemongrass, pepper wintergreen, rosemary, cinnamon, sesame, thyme, cedar oils and capsaicin); neem oil (e.g., Azadirachtin); nicotine; microbial products (e.g., *Bacillus thuringeinis* and *Beauveria bassiana*); oxadiazines (e.g., Indoxacarb); anthranilic diamide (e.g., chlorantraniliprole); juvenile hormone mimics (e.g., fenoxycarb; pyriproxifen; methoprene; and hydroprene), pyrroles (e.g., chlorfenapyr), phenylpyrazoles (e.g., fipronil), organophosphates (e.g., malathion and chlorpyrifos), inorganics (e.g., sulfur and dormant and horticultural oils); insect growth regulators such as chitin synthesis inhibitors (e.g., hexaflumuron; noviflumuron; diflubenzuron; buprofezine; cyromazine; and halofenozide); acaricides such as miticides (e.g., avermectin) and ixodicides alone or in any combination with the compositions of the present disclosure. Fungicides that may be used with the disclosed drift reduction adjuvant compositions include but are not limited to: fluxapyroxad, pyraclostrobin, propiconazole, trifloxystrobin, prothioconazole, 1,2-propanediol, azoxystrobin (e.g. Priaxor®, Onset®, Topaz®, Headline® amp, Headline® sc, Stratego®, Quadris®) alone or in any combination with the compositions of the present disclosure.

Other pesticide additives may include nematocides, plant growth regulators and animal repellents.

In addition or alternatively, the drift reduction adjuvant compositions disclosed herein may be used with desiccants and defoliants.

It is believed that the drift reduction adjuvant compositions that include guar gum and perforation-aid type adjuvants disclosed herein in combination with any of the pesticides, herbicides, insecticides, fungicides, pesticide additives, desiccants, and/or defoliants reduces the number of fine droplets and manages (e.g., either reduces, maintains, or increases) the number of ultra-coarse droplets compared to pesticides, herbicides, insecticides, fungicides, pesticide additives, desiccants, and/or defoliants that do not include the DRT adjuvants. For example, Tables 1 to 3 demonstrate that drift reduction adjuvant compositions can be used efficaciously with four different pesticides.

When water in an admixture containing herbicide and DRT adjuvant is hard water, water conditioners such as Class Act® NG® may be admixed in order to prevent trace impurities from binding with the herbicide (e.g., precipitating). The water conditioner includes cations and anions that bind with the impurities making them unavailable for precipitating with the herbicide, and further, the water conditioner may bind to sites on the herbicide to further prevent the impurities from antagonizing the herbicide.

Improvements in reduction of fines and management of ultra-coarse droplets in agricultural sprays delivered are discussed further in the Examples. Those of skill will understand that the following Examples are provided for purposes of illustration and should not be construed as limiting.

EXAMPLES

Study 1:

The droplet spectrum of dicamba (3,6-dichloro-2-methoxybenzoic acid) with glyphosate (N-(phosphonomethyl)glycine) as well as dicamba alone, in combination with various drift reduction adjuvant compositions were assessed on a volume basis to identify 1) the reduction of fine droplets, and 2) management of ultra-coarse" droplets above 622 um in diameter.

Materials and Methods: Three different adjuvant technologies at different inclusion rates were tested against a control in combination with two different herbicide technologies:dicamba with glyphosate, and dicamba alone. The adjuvant technologies included: 1) guar gum (0.020% (v/v) and 0.012% (v/v) of the total agricultural spray); 2) MSO DRT (0.313% (v/v) (containing 95.2% (v/v) MSO and 4.8% (v/v) surfactant and inerts)); 3) MSO DRT+guar gum (0.313%|0.020% (v/v) and 0.156%|0.012% (v/v) of the total agricultural spray).

Testing was conducted under low-speed, atmospheric conditions analogous to ground application of agricultural sprays. All testing was conducted within a recirculating low-speed wind tunnel (described in U.S. Pat. Nos. 8,689,619 and 9,116,068), providing coaxial airflow for improved measurement quality, operated at 7.75±0.5 mph. The solutions were sprayed through a TeeJet TTI11004 (Spraying Systems Co, Wheaton, Ill., USA) agricultural nozzle, which is a drift reduction nozzle, operated at 60 psi fluid pressure with nominal flow rate of 0.4 gal min-1 and spray angle of 110°. The droplet spectra were measured with a Sympatec HELOS VARIO-KR H2508 laser diffraction system (serial no. 3174) with R7 optics (0.5 to 3500 μm), using WINDOX 5.6.2.0 software. The measurement domain was located 18±1 inch downstream of the spray nozzle exit.

The measurement of the spray droplet spectrum was collected by traversing the entire spray plume through the measurement domain. For a single sample, the spray arm was traversed at 3.13 inch sec-1, passing the entire spray fan plume across the measurement domain. The spray was sampled for 16 seconds.

Results: Table 1 provides the droplet spectrum results of spraying various drift reduction adjuvant compositions in combination with the two herbicides. The results listed in Table 1 are an average of five individual samples, with uncertainties of ±3%.

TABLE 1

| Herbicide Technology | Adjuvant Technology | % Vol. <150 um | % Vol. >622 um | Dv10 (um) | Dv50 (um) | Dv90 (um) | VMD (um) |
|---|---|---|---|---|---|---|---|
| Dicamba + Glyphosate | None. | 1.4 | 51.7 | 287 | 637 | 1112 | 670 |
| Dicamba + Glyphosate | Guar Gum (0.020% (v/v)) | 0.7 | 68.8 | 367 | 810 | 1292 | 820 |
| Dicamba + Glyphosate | MSO DRT (0.313% (v/v)) | 1.3 | 42.1 | 277 | 568 | 920 | 584 |
| Dicamba + Glyphosate | MSO DRT + Guar Gum (0.313%\|0.020% (v/v)) | 0.9 | 58.1 | 324 | 686 | 1078 | 695 |
| Dicamba | None. | 0.9 | 58.8 | 328 | 694 | 1089 | 702 |
| Dicamba | Guar Gum (0.012% (v/v)) | 0.6 | 73.0 | 409 | 845 | 1280 | 843 |
| Dicamba | MSO DRT (0.313% (v/v)) | 1.8 | 30.2 | 256 | 509 | 782 | 527 |
| Dicamba | MSO DRT + Guar Gum (0.156%\|0.012% (v/v)) | 0.6 | 65.9 | 370 | 751 | 1131 | 751 |

Guar Gum: Guar gum is traditionally used alone as a thickener to provide a DRT adjuvant. Guar gum (0.313% (v/v)) in combination with dicamba and glyphosate in the agricultural spray reduced fine droplets less than 150 μm in diameter ("fines") by 0.7 relative to control, but significantly increased the amount of ultra-coarse by 17 percent relative to the control. Further, this spray had a VMD of 820 μm. When sprayed with dicamba as the herbicide in an agricultural spray, the guar gum (0.012% (v/v)) resulted in another significant increase in ultra-coarse droplets, over 21 percent relative to the control. Overall, using guar gum alone as an adjuvant is unacceptable due to the excess ultra-coarse droplets produced in the agricultural spray.

MSO DRT: MSO DRT (0.313% (v/v)) in this study in combination with dicamba and glyphosate in the agricultural spray resulted in producing fines at 1.3 percent, which is not statistically different from the control. The reduction of ultra-coarse droplets by 9.6 percentage points relative to the control is inconsequential due to MSO DRT not reducing driftable fines. When sprayed with dicamba as the herbicide in an agricultural spray, the MSO DRT (0.313% (v/v)) resulted in increasing the level of fines from the control. Consequently, it was realized that the MSO DRT (0.313% (v/v)) is ineffective at reducing fines.

MSO DRT+Guar Gum: The MSO DRT and guar gum adjuvant composition of the present disclosure, when sprayed with the herbicide admixture, simultaneously reduced the number of fines, managed ultra-coarse droplets, and further reduced the size variability in which the droplets are larger than fine droplets but smaller than ultra-ultra-coarse droplets.

With respect to the columns for % Vol <150 μm and % Vol. >622 μm, the use of the MSO DRT and guar gum adjuvant (0.313%|0.020% (v/v)) with dicamba and glyphosate as the herbicide resulted in reducing fines by 0.5 percentage points relative to the control, and the level of ultra-coarse droplets were managed by only a slight increase in these droplets of 6.4 percentage points. With respect to the volume distribution statistics columns (Dv10, Dv50 and Dv90), the first 10 percent of this spray (Dv10) had an average droplet size of 324 μm, the mass median diameter of the spray (Dv50) had an average droplet size of 686 μm, and the last 10 percent of the spray (Dv90) had and average droplet size of 1078 μm, each an improvement over the control. With respect to volume mean diameter (VMD) column, this spray had a VMD of 695 μm, an improvement from the control having a VMD of 670 μm.

The use of the MSO DRT and guar gum adjuvant (0.156%|0.012% (v/v)) with dicamba as the herbicide resulted in reducing fines by 0.8 percentage points relative to the control, and the level of ultra-coarse droplets were managed by an increase in these droplets of 14.2 percentage points. With respect to the mass median diameter, the first 10 percent of this spray (Dv10) had an average droplet size of 370 μm, 50 percent of the spray (Dv50) had an average droplet size of 751 μm, and the last 10 percent of the spray (Dv90) had and average droplet size of 1131 μm, each an improvement over the control. With respect to VMD, this spray had a VMD of 751 μm, an improvement from the control having a VMD of 670 μm. In view of the results of Table 1, the drift reduction adjuvant compositions containing MSO DRT and guar gum resulted in a statistical shift in fine droplets, with less of an impact on ultra-coarse droplets, meaning the MSO DRT and guar gum combination performed better than either guar gum alone or MSO DRT alone.

Study 2:

The droplet spectrum of dicamba with glyphosate, or dicamba alone, in combination varying rates of guar gum (0.009-0.020% (v/v) of the total agricultural spray) and MSO DRT (0.117 to 0.391% (v/v) of the total agricultural spray) were assessed on a volume basis to identify the extent of the effects of the aforementioned combination on the reduction of fines and management of ultra-coarse droplets.

Materials and Methods: All testing was conducted within a recirculating low-speed wind tunnel (described in U.S. Pat. Nos. 8,689,619 and 9,116,068) using the approach described in Study 1. However, for a single sample, the spray arm was traversed downwards at 3.13 inch sec-1, passing half the spray fan plume across the measurement domain, and then returning vertically. The spray was sampled for 16 seconds.

Results: Table 2 provides the droplet spectrum results of spraying dicamba with glyphosate or dicamba alone in combination with varying rates of guar gum and methylated seed oil (MSO) DRT to identify the extent of the effects of the aforementioned combination on the reduction of fines and management of ultra-coarse droplets. The results listed in Table 2 are an average of two duplicate samples, with uncertainties of ±10%.

TABLE 2

DRT Adjuvant sprays of guar gum from 0.009% to 0.02% (v/v) in combination with MSO DRT at 0.078% to 0.391% (v/v)

| Herbicide Technology | Guar Gum % (v/v) | MSO DRT % (v/v) | % Vol. <150 um | % Vol. >622 um | VMD |
|---|---|---|---|---|---|
| Dicamba + Glyphosate (control) | 0.000 | 0.000 | 2.01 | 49.19 | 615 |
| Dicamba + Glyphosate | 0.009 | 0.000 | 1.76 | 54.33 | 656 |
| Dicamba + Glyphosate | 0.009 | 0.195 | 1.56 | 50.40 | 625 |
| Dicamba + Glyphosate | 0.009 | 0.156 | 1.37 | 47.26 | 602 |
| Dicamba + Glyphosate | 0.009 | 0.234 | 1.68 | 48.66 | 612 |
| Dicamba + Glyphosate | 0.011 | 0.000 | 1.37 | 56.07 | 676 |
| Dicamba + Glyphosate | 0.011 | 0.195 | 1.59 | 49.01 | 615 |
| Dicamba + Glyphosate | 0.011 | 0.273 | 1.77 | 53.03 | 645 |
| Dicamba + Glyphosate | 0.011 | 0.234 | 1.64 | 48.28 | 609 |
| Dicamba + Glyphosate | 0.013 | 0.000 | 1.60 | 53.43 | 648 |
| Dicamba + Glyphosate | 0.013 | 0.117 | 1.31 | 53.27 | 647 |
| Dicamba + Glyphosate | 0.013 | 0.195 | 1.48 | 52.27 | 639 |
| Dicamba + Glyphosate | 0.013 | 0.156 | 1.42 | 53.63 | 650 |
| Dicamba + Glyphosate | 0.013 | 0.273 | 1.62 | 57.84 | 692 |
| Dicamba + Glyphosate | 0.013 | 0.234 | 1.51 | 55.70 | 668 |
| Dicamba + Glyphosate | 0.013 | 0.313 | 1.62 | 51.65 | 635 |

TABLE 2-continued

DRT Adjuvant sprays of guar gum from 0.009% to 0.02% (v/v) in combination with MSO DRT at 0.078% to 0.391% (v/v)

| Herbicide Technology | Guar Gum % (v/v) | MSO DRT % (v/v) | % Vol. <150 um | % Vol. >622 um | VMD |
|---|---|---|---|---|---|
| Dicamba + Glyphosate | 0.014 | 0.195 | 1.43 | 53.15 | 646 |
| Dicamba + Glyphosate | 0.014 | 0.156 | 1.44 | 50.06 | 622 |
| Dicamba + Glyphosate | 0.014 | 0.273 | 1.45 | 51.58 | 634 |
| Dicamba + Glyphosate | 0.014 | 0.234 | 1.39 | 50.39 | 625 |
| Dicamba + Glyphosate | 0.016 | 0.391 | 1.39 | 61.77 | 731 |
| Dicamba + Glyphosate | 0.016 | 0.195 | 1.33 | 55.06 | 662 |
| Dicamba + Glyphosate | 0.016 | 0.156 | 1.17 | 58.50 | 692 |
| Dicamba + Glyphosate | 0.016 | 0.234 | 1.18 | 57.61 | 683 |
| Dicamba (control) | 0.000 | 0.000 | 1.14 | 59.13 | 702 |
| Dicamba | 0.009 | 0.000 | 1.10 | 66.12 | 774 |
| Dicamba | 0.009 | 0.195 | 1.13 | 57.60 | 679 |
| Dicamba | 0.009 | 0.156 | 1.18 | 56.23 | 669 |
| Dicamba | 0.009 | 0.234 | 1.17 | 56.90 | 673 |
| Dicamba | 0.011 | 0.195 | 1.07 | 59.45 | 695 |
| Dicamba | 0.011 | 0.156 | 1.10 | 59.67 | 697 |
| Dicamba | 0.011 | 0.273 | 1.09 | 59.52 | 694 |
| Dicamba | 0.011 | 0.234 | 1.15 | 59.27 | 693 |
| Dicamba | 0.013 | 0.000 | 1.00 | 69.46 | 811 |
| Dicamba | 0.013 | 0.117 | 0.92 | 64.89 | 749 |
| Dicamba | 0.013 | 0.078 | 0.83 | 67.25 | 774 |
| Dicamba | 0.013 | 0.195 | 1.04 | 61.75 | 715 |
| Dicamba | 0.013 | 0.156 | 1.02 | 62.81 | 724 |
| Dicamba | 0.013 | 0.234 | 1.04 | 62.06 | 717 |
| Dicamba | 0.013 | 0.313 | 1.02 | 61.90 | 715 |
| Dicamba | 0.014 | 0.195 | 0.94 | 62.48 | 722 |
| Dicamba | 0.014 | 0.156 | 0.85 | 67.16 | 771 |
| Dicamba | 0.014 | 0.273 | 0.96 | 71.71 | 840 |
| Dicamba | 0.014 | 0.234 | 0.92 | 64.63 | 742 |
| Dicamba | 0.016 | 0.000 | 1.06 | 61.87 | 715 |
| Dicamba | 0.016 | 0.195 | 0.88 | 65.82 | 757 |
| Dicamba | 0.016 | 0.156 | 0.97 | 63.57 | 730 |
| Dicamba | 0.016 | 0.234 | 0.91 | 72.81 | 850 |

As reflected in Table 2, drift reduction adjuvant compositions of guar gum from 0.009% to 0.016% (v/v) in combination with MSO DRT at 0.078% to 0.391% (v/v) produces efficacious sprays that result in fewer fine and either reduces, maintains or increases by up to 15 percentage points the number of ultra-coarse droplets compared to an agricultural spray of the pesticide without the drift reduction adjuvant composition delivered from the same nozzle.

With respect to dicamba and glyphosate has the herbicide, spraying this herbicide with the drift reduction adjuvant composition of guar gum at 0.009% to 0.016% (v/v) and MSO DRT at 0.117% to 0.391% (v/v) reduced fines and either reduced, maintained or increased by up to 13 percentage points the number of ultra-coarse droplets compared to an agricultural spray of the pesticide without the drift reduction adjuvant composition delivered from the same nozzle. For example, spraying this herbicide with the drift reduction adjuvant composition of guar gum at 0.009% to 0.011% (v/v) and MSO DRT at 0.156% to 0.273% (v/v) reduced fines and only slightly increased the level of ultra-coarse droplets relative to the control in which dicamba and glyphosate was sprayed without the drift reduction adjuvant composition, and further, this spray reduced the level of ultra-coarse droplets relative to spraying this herbicide with guar gum alone as the adjuvant. In another example, spraying guar gum at 0.013% (v/v) and MSO DRT at 0.117% to 0.273% (v/v) reduced fines below that produced when spraying with the same herbicide but with guar gum alone, while simultaneously maintaining the level of ultra-coarse droplets produced compared to spraying guar gum alone, which was less than 5 percentage points above the level of ultra-coarse droplets produced by spraying the herbicide control. Similar results were achieved when spraying the drift reduction adjuvant composition at 0.014% (v/v) and MSO DRT at similar levels.

With respect to spraying dicamba as the herbicide, spraying this herbicide with the drift reduction adjuvant composition of guar gum at 0.009% to 0.02% (v/v) and MSO DRT at 0.078% to 0.391% (v/v) both reduced fines and either reduced, maintained or increased by up to 15 percentage points the number of ultra-coarse droplets compared to an agricultural spray of the pesticide without the drift reduction adjuvant composition delivered from the same nozzle. For example, spraying this herbicide with the drift reduction adjuvant composition of guar gum at 0.011% (v/v) and MSO DRT at 0.156% to 0.273% (v/v) both reduced fines and substantially controlled the level of increased ultra-coarse droplets relative to the control in which dicamba was sprayed without the drift reduction adjuvant composition. Spraying dicamba as the herbicide with the drift reduction adjuvant composition of guar gum at 0.013% (v/v) and MSO DRT at 0.078% to 0.234% (v/v) reduced fines, maintained the level of ultra-coarse droplets within 10 percentage points relative to the control in which dicamba was sprayed without the drift reduction adjuvant composition, and further, reduced the level of ultra-coarse droplets relative to spraying dicamba and guar gum alone as the adjuvant. Similar results were achieved when spraying the drift reduction adjuvant composition at 0.014 (v/v) and MSO DRT at similar levels.

It is believed that combinations of guar gum and MSO DRT at broader ranges, such as guar gum at 0.0045% (v/v) to 0.032% (v/v) and MSO DRT at 0.039% to 0.782% (v/v) may provide efficacious sprays that reduce fines and control the level of ultra-coarse droplets by up to 15 percentage points, or less, compared to an agricultural spray of the pesticide without the drift reduction adjuvant composition delivered from the same nozzle.

Study 3:

The droplet spectrum of XteniMAX or XteniMAX combined with Roundup PowerMax®, in combination with varying rates of guar gum (e.g., $1.01\times10^{-4}$-$2.15\times10^{-4}$ g/ml of the total agricultural spray) and MSO DRT (0.08-0.27% (v/v) of the total agricultural spray) were assessed on a volume basis to identify the extend of the effects of the aforementioned combination on the reduction of fines and management of ultra-coarse droplets.

Materials and Methods: All testing was conducted within a recirculating low-speed wind tunnel (described in U.S. Pat. Nos. 8,689,619 and 9,116,068) using the approach described in Study 1. The agricultural spray was sprayed using a TTI 11004 nozzle.

Results: Table 3 provides the droplet spectrum results of spraying XteniMAX or XteniMAX combined with Roundup PowerMax® (shown as XtendiMAX_RUPM in Table 3), in combination with varying rates of guar gum and MSO DRT to identify the extend of the effects of the aforementioned combination on the reductions of fines and management of ultra-coarse droplets.

TABLE 3

DRT Adjuvant sprays of guar gum from 1.18 × 10−4 to 2.15 × 10−4 g/ml in combination with MSO DRT at 0.08% to 0.31% (v/v)

| Herbicide | Guar Gum g/mL | MSO DRT % (v/v) | % Spray Vol. <150 um | % Spray Vol. >622 um | VMD (μm) |
|---|---|---|---|---|---|
| XtendIMAX | 0.000000 | 0.00 | 1.14 | 59.13 | 701.87 |
| XtendIMAX | 0.000101 | 0.00 | 1.10 | 66.12 | 694.68 |
| XtendIMAX | 0.000101 | 0.16 | 1.18 | 56.23 | 696.51 |
| XtendIMAX | 0.000101 | 0.20 | 1.13 | 57.60 | 693.68 |
| XtendIMAX | 0.000101 | 0.23 | 1.17 | 56.90 | 692.80 |
| XtendIMAX | 0.000118 | 0.16 | 1.10 | 59.67 | 773.75 |
| XtendIMAX | 0.000118 | 0.20 | 1.07 | 59.45 | 678.89 |
| XtendIMAX | 0.000118 | 0.23 | 1.15 | 59.27 | 668.66 |
| XtendIMAX | 0.000118 | 0.27 | 1.09 | 59.52 | 673.05 |
| XtendIMAX | 0.000135 | 0.00 | 1.00 | 69.46 | 722.28 |
| XtendIMAX | 0.000135 | 0.08 | 0.83 | 67.25 | 771.20 |
| XtendIMAX | 0.000135 | 0.12 | 0.92 | 64.89 | 840.08 |
| XtendIMAX | 0.000135 | 0.16 | 1.02 | 62.81 | 741.83 |
| XtendIMAX | 0.000135 | 0.20 | 1.04 | 61.75 | 810.95 |
| XtendIMAX | 0.000135 | 0.23 | 1.04 | 62.06 | 748.73 |
| XtendIMAX | 0.000135 | 0.31 | 1.02 | 61.90 | 773.84 |
| XtendIMAX | 0.000151 | 0.16 | 0.85 | 67.16 | 715.07 |
| XtendIMAX | 0.000151 | 0.20 | 0.94 | 62.48 | 724.46 |
| XtendIMAX | 0.000151 | 0.23 | 0.92 | 64.63 | 717.03 |
| XtendIMAX | 0.000151 | 0.27 | 0.96 | 71.71 | 714.84 |
| XtendIMAX | 0.000168 | 0.00 | 1.06 | 61.87 | 715.14 |
| XtendIMAX | 0.000168 | 0.16 | 0.97 | 63.57 | 756.91 |
| XtendIMAX | 0.000168 | 0.20 | 0.88 | 65.82 | 730.26 |
| XtendIMAX | 0.000168 | 0.23 | 0.91 | 72.81 | 850.16 |
| XtendIMAX | 0.000215 | 0.00 | 0.77 | 69.05 | 785.77 |
| XtendIMAX_RUPM | 0.000000 | 0.00 | 2.01 | 49.19 | 614.87 |
| XtendIMAX_RUPM | 0.000101 | 0.00 | 1.76 | 54.33 | 675.59 |
| XtendIMAX_RUPM | 0.000101 | 0.16 | 1.37 | 47.26 | 614.64 |
| XtendIMAX_RUPM | 0.000101 | 0.20 | 1.56 | 50.40 | 645.41 |
| XtendIMAX_RUPM | 0.000101 | 0.23 | 1.68 | 48.66 | 609.35 |
| XtendIMAX_RUPM | 0.000118 | 0.00 | 1.37 | 56.07 | 656.00 |
| XtendIMAX_RUPM | 0.000118 | 0.20 | 1.59 | 49.01 | 624.97 |
| XtendIMAX_RUPM | 0.000118 | 0.23 | 1.64 | 48.28 | 602.04 |
| XtendIMAX_RUPM | 0.000118 | 0.27 | 1.77 | 53.03 | 612.17 |
| XtendIMAX_RUPM | 0.000135 | 0.00 | 1.60 | 53.43 | 646.37 |
| XtendIMAX_RUPM | 0.000135 | 0.12 | 1.31 | 53.27 | 622.44 |
| XtendIMAX_RUPM | 0.000135 | 0.16 | 1.42 | 53.63 | 633.89 |
| XtendIMAX_RUPM | 0.000135 | 0.20 | 1.48 | 52.27 | 624.93 |
| XtendIMAX_RUPM | 0.000135 | 0.23 | 1.51 | 55.70 | 648.15 |
| XtendIMAX_RUPM | 0.000135 | 0.27 | 1.62 | 57.84 | 646.85 |
| XtendIMAX_RUPM | 0.000135 | 0.31 | 1.62 | 51.65 | 639.32 |
| XtendIMAX_RUPM | 0.000151 | 0.16 | 1.44 | 50.06 | 649.92 |
| XtendIMAX_RUPM | 0.000151 | 0.20 | 1.43 | 53.15 | 692.49 |
| XtendIMAX_RUPM | 0.000151 | 0.23 | 1.39 | 50.39 | 667.84 |
| XtendIMAX_RUPM | 0.000151 | 0.27 | 1.45 | 51.58 | 634.52 |
| XtendIMAX_RUPM | 0.000168 | 0.16 | 1.17 | 58.50 | 731.29 |
| XtendIMAX_RUPM | 0.000168 | 0.20 | 1.33 | 55.06 | 661.74 |
| XtendIMAX_RUPM | 0.000168 | 0.23 | 1.18 | 57.61 | 691.63 |
| XtendIMAX_RUPM | 0.000168 | 0.39 | 1.39 | 61.77 | 682.95 |
| XtendIMAX_RUPM | 0.000215 | 0.00 | 1.34 | 63.94 | 756.26 |

As reflected in Table 3, drift reduction adjuvant compositions of guar gum from $1.18\times10^{-4}$ to $2.15\times10^{-4}$ g/ml in combination with MSO DRT at 0.08% to 0.31% (v/v) produced efficacious sprays that resulted in fewer fine droplets and either reduced, maintained or increased by up to 25 percentage points the number of ultra-coarse droplets compared to an agricultural spray of the pesticide without the drift reduction adjuvant composition delivered from the same nozzle. For example, most of the drift reduction adjuvant compositions increased the number of ultra-coarse droplets by up to 20 percentage points or up to 15 percentage points.

With respect to XteniMAX as the herbicide, spraying this herbicide with the drift reduction adjuvant composition of guar gum at $1.18\times10^{-4}$ to $2.15\times10^{-4}$ g/ml and MSO DRT at 0.08% to 0.31% (v/v) reduced fines and either reduced, maintained or increased by up to 25 percentage points the number of ultra-coarse droplets compared to an agricultural spray of the pesticide without the drift reduction adjuvant composition delivered from the same nozzle. For example, spraying this herbicide with the drift reduction adjuvant composition of guar gum at $1.18\times10^{-4}$ to $1.51\times10^{-4}$ g/ml and MSO DRT at 0.12% to 0.31% (v/v) reduced fines and, for the most part, only slightly increased the level of ultra-coarse droplets relative to the control, and further, this spray reduced the level of ultra-coarse droplets relative to spraying this herbicide with guar gum alone as the adjuvant with only one exception.

With respect to spraying XtendiMAX and Roundup Max PowerMax® as the herbicide, spraying this herbicide with the drift reduction adjuvant composition of guar gum at $1.18\times10^{-4}$ to $1.68\times10^{-4}$ g/ml in combination with MSO DRT at 0.12% to 0.31% (v/v) both reduced fines and either reduced, maintained or increased by up to 20 percentage points (e.g., up to 13 percentage points) the number of ultra-coarse droplets compared to an agricultural spray of the pesticide without the adjuvant delivered from the same nozzle. It is noted that, as shown in Table 3, slightly increasing the amount of herbicide and/or MSO above this range still reduced fines and only marginally increased (e.g., up to 30 percentage points) the amount of ultra-coarse droplets. For example, spraying this herbicide with the drift reduction adjuvant composition of guar gum at $1.18\times10^{-4}$ to $1.35\times10^{-4}$ g/ml in combination with MSO DRT at 0.12% to 0.23% (v/v) both reduced fines and substantially managed the number of ultra-coarse droplets relative to the control in which dicamba was sprayed without the drift reduction adjuvant composition.

It is believed that combinations of guar gum and MSO DRT at broader ranges, such as guar gum at $0.7\times10^{-4}$ to $5.2\times10^{-4}$ g/ml in combination with MSO DRT at 0.039% to 0.782% (v/v) may provide efficacious sprays that reduce fines and control the level of ultra-coarse droplets by up to 30 percentage points, or less, compared to an agricultural spray of the pesticide without the adjuvant delivered from the same nozzle.

Study 4:

The droplet spectrum of different compositions (with and without guar gum (e.g., $2.67\times10^{-4}$ g/ml of the total mixture). Some of the compositions also included a perforation-aid type adjuvant (referred to as "Perforation Adjuvant" in Table 4). The compositions were assessed on a volume basis to identify the extend of the effects of the compositions with and without guar gum on the reduction of fines and management of ultra-coarse droplets.

Materials and Methods: All testing was conducted within a recirculating low-speed wind tunnel (described in U.S. Pat. Nos. 8,689,619 and 9,116,068) using the approach described in Study 1. The agricultural spray was sprayed using a TTI 11004 nozzle.

Composition 1 (i.e., the control) only included water. Composition 2 included water mixed with a first perforation-aid type adjuvant at $2.062\times10^{-4}$ g/ml of the total composition. The first perforation-aid type adjuvant included soybean oil methylester (i.e., an oil), petroleum hydrocarbons (i.e., a solvent and oil), and fatty acids of tall oil (i.e., an oil and surfactant). Composition 3 included water mixed with a second perforation-aid type adjuvant at $2.16\times10^{-4}$ g/ml of the total composition. The second perforation-aid type adjuvant included modified vegetable oil (i.e., an oil), petroleum oil (i.e., a solvent and oil), and alkyl phenol ethoxylate (i.e., a surfactant). Composition 4 included water mixed with a third perforation-aid type adjuvant at $1.23\times10^{-4}$ g/ml of the total composition. The third perforation-aid type adjuvant included crop-based guar gum (i.e., a rhelology modifier), MSO (i.e., an oil), etholylated alcohol (i.e., a surfactant), and soy lecithin (i.e., a surfactant). Composition 5 included water mixed with a fourth perforation-aid type adjuvant as $2.53\times10^{-4}$ g/ml of the total composition. The fourth perforation-aid type adjuvant included lecithin (i.e., a surfactant), alkylphenol ethoxylate phosphate ester (i.e., a surfactant), methyl soyate (i.e., an oil), and demethylpolysiloxane (i.e., a surfactant and rheology modifier).

TABLE 4

DRT Adjuvant sprays of different compositions with or without guar gum, some of the compositions including perforation-aid type adjuvants

| Composition | Guar Gum g/mL | Perforation Adjuvant g/mL | % Spray Vol. <150 um | % Spray Vol. >622 um | Vol. Median Diam. (Dv50) |
|---|---|---|---|---|---|
| Composition 1 (Control) | 0.000E+00 | 0.000E+00 | 1.62 | 50.97 | 630 |
| Composition 1 | 2.661E−04 | 0.000E+00 | 0.51 | 77.63 | 904 |
| Composition 2 | 0.000E+00 | 2.062E−03 | 2.21 | 35.87 | 533 |
| Composition 2 | 2.661E−04 | 2.062E−03 | 0.85 | 67.02 | 759 |
| Composition 3 | 0.000E+00 | 2.155E−03 | 2.68 | 31.43 | 504 |
| Composition 3 | 2.661E−04 | 2.155E−03 | 0.96 | 60.80 | 707 |
| Composition 4 | 0.000E+00 | 1.225E−03 | 2.59 | 28.64 | 489 |
| Composition 4 | 2.661E−04 | 1.225E−03 | 0.85 | 63.99 | 737 |
| Composition 5 | 0.000E+00 | 2.525E−03 | 2.56 | 33.29 | 513 |
| Composition 5 | 2.661E−04 | 2.525E−03 | 0.81 | 65.79 | 750 |

Referring to Table 4, Composition 1 that was not mixed with guar gum ("Control") included 1.62% (v/v) fine droplets and 50.97% (v/v) ultra-coarse droplets. Mixing the guar gum with Composition 1 reduced the number of fine droplets relative to control by 69% thereby decreasing fines relative to Control. However, mixing the guar gum with Composition 1 increased the number of ultra-coarse droplets by 52% compared to Control.

Each of perforation-aid type adjuvant (e.g., Compositions 2-5) that were not mixed with guar gum significantly decreased the number of ultra-coarse droplets compared to Control. For example, each of perforation-aid type adjuvant that were not mixed with guar gum decreased the number of ultra-coarse by at least 30% compared to Control. However, each of perforation-aid type adjuvant that were not mixed with guar gum increased the number of fine droplets by at least 36% compared to Control. As such, each of perforation-aid type adjuvant without guar gum would increase fines compared to Control.

Each of perforation-aid type adjuvant that were mixed with guar gum increased the number of ultra-coarse droplets compared to control. However, the increase in the number of ultra-coarse droplets generated by each of perforation-aid type adjuvant that were mixed with guar gum were less than the number of ultra-coarse droplets generated by mixing guar gum with Composition 1 (e.g., a mixture without the perforation-aid type adjuvant). Additionally, mixing guar gum with the perforation-aid type adjuvant increased the number of fine droplets compared to mixing guar gum with Composition 1. However, mixing guar gum with the perforation-aid type adjuvant reduced the number of fine droplets by at least 40% compared to Control. As such, Table 4 demonstrates that mixing guar gum with perforation-aid type adjuvants can reduce the number of fine droplets compared to an adjuvant that only includes the perforation-aid type adjuvant while also decreasing the number of ultra-coarse droplets compared to an adjuvant that includes guar gum without the perforation-aid type adjuvant.

It is believed that combinations of guar gum and perforation-aid type adjuvant at broader ranges, such as guar gum at $0.7\times10^{-4}$ to $5.2\times10^{-4}$ g/ml in combination with perforation-aid type adjuvant at $0.2\times10^{-4}$ to $6\times10^{-3}$ g/ml may provide efficacious sprays that reduce fines and manage the level of ultra-coarse droplets compared to an agricultural spray of the pesticide without the adjuvant delivered from the same nozzle. Additionally, it is believed that the combinations discussed in Study 4 would have the same effect on mixtures that included herbicides, pesticides, or any other chemical disclosed herein.

Study 5:

The droplet spectrum of dicamba with glyphosate in combination with varying rates of guar gum ($0\text{-}2.69\times10^{-4}$ g/ml) of the total agricultural spray) and MSO DRT ($0\text{-}1.72\times10^{-4}$ g/ml of the total agricultural spray) with various nozzles were assessed on a volume basis to identify the extent of the effects of the aforementioned combination on the reduction of fines and management of ultra-coarse droplets.

Materials and Methods: All testing was conducted within a recirculating low-speed wind tunnel (described in U.S. Pat. Nos. 8,689,619 and 9,116,068) using the approach described in Study 1. Nozzles used included A111003, TTI11004, ULD12005, AIXR11004, and XR11003.

Results: Table 5 provides the droplet spectrum results of spraying dicamba with glyphosate in combination with varying rates of guar gum and MSO DRT with various nozzles to identify the extent of the effects of the aforementioned combination on the reduction of fines and management of ultra-coarse droplets.

TABLE 5

DRT Adjuvant sprays of guar gum from 0 to 2.59 x 10−4 g/m in combination with MSO DRT at 0 to 1.72 x 10−4 with various nozzles

| Nozzle | Guar Gum g/mL | MSO DRT g/mL | % Spray Vol. <150 um | % Spray Vol. >622 um | Vol. Median Diam. (Dv50) |
|---|---|---|---|---|---|
| AI11003 | 0.000E+00 | 0.000E+00 | 3.93 | 23.48 | 471 |
| AI11003 | 2.152E−04 | 0.000E+00 | 2.12 | 45.39 | 588 |
| AI11003 | 1.345E−04 | 1.719E−03 | 1.29 | 38.41 | 564 |
| AI11003 | 1.345E−04 | 1.375E−03 | 1.34 | 39.03 | 564 |
| AI11003 | 1.681E−04 | 1.719E−03 | 1.30 | 41.77 | 590 |
| AI11003 | 1.681E−04 | 1.375E−03 | 1.22 | 38.65 | 568 |
| AI11003 | 2.018E−04 | 1.719E−03 | 1.54 | 21.86 | 489 |
| AI11003 | 2.018E−04 | 1.375E−03 | 2.45 | 19.92 | 474 |
| AI11003 | 2.690E−04 | 1.719E−03 | 0.93 | 50.79 | 637 |
| AI11003 | 2.690E−04 | 1.375E−03 | 0.89 | 52.29 | 639 |
| AI11003 | 0.000E+00 | 1.719E−03 | 1.57 | 24.06 | 493 |
| AI11003 | 0.000E+00 | 1.375E−03 | 1.49 | 26.97 | 500 |
| TTI11004 | 0.000E+00 | 0.000E+00 | 1.21 | 52.33 | 642 |
| TTI11004 | 2.152E−04 | 0.000E+00 | 0.51 | 73.48 | 870 |
| TTI11004 | 1.345E−04 | 1.719E−03 | 1.06 | 55.83 | 666 |
| TTI11004 | 1.345E−04 | 1.375E−03 | 1.11 | 54.82 | 658 |
| TTI11004 | 1.681E−04 | 1.719E−03 | 1.02 | 56.95 | 677 |
| TTI11004 | 1.681E−04 | 1.375E−03 | 0.94 | 58.64 | 690 |
| TTI11004 | 2.018E−04 | 1.719E−03 | 0.84 | 60.38 | 705 |
| TTI11004 | 2.018E−04 | 1.375E−03 | 0.91 | 59.82 | 698 |
| TTI11004 | 2.690E−04 | 1.719E−03 | 0.68 | 64.53 | 746 |
| TTI11004 | 2.690E−04 | 1.375E−03 | 0.57 | 67.83 | 781 |
| TTI11004 | 0.000E+00 | 1.719E−03 | 1.19 | 45.13 | 588 |
| TTI11004 | 0.000E+00 | 1.375E−03 | 1.18 | 45.01 | 586 |
| ULD12005 | 0.000E+00 | 0.000E+00 | 2.05 | 33.66 | 521 |
| ULD12005 | 2.152E−04 | 0.000E+00 | 1.07 | 57.57 | 682 |
| ULD12005 | 1.345E−04 | 1.719E−03 | 1.20 | 49.56 | 619 |
| ULD12005 | 1.345E−04 | 1.375E−03 | 1.23 | 48.94 | 615 |
| ULD12005 | 1.681E−04 | 1.719E−03 | 1.27 | 41.27 | 585 |

TABLE 5-continued

DRT Adjuvant sprays of guar gum from 0 to 2.59 × 10−4 g/m in combination with MSO DRT at 0 to 1.72 × 10−4 with various nozzles

| Nozzle | Guar Gum g/mL | MSO DRT g/mL | % Spray Vol. <150 um | % Spray Vol. >622 um | Vol. Median Diam. (Dv50) |
|---|---|---|---|---|---|
| ULD12005 | 1.681E−04 | 1.375E−03 | 1.24 | 50.49 | 626 |
| ULD12005 | 2.018E−04 | 1.719E−03 | 1.02 | 52.73 | 642 |
| ULD12005 | 2.018E−04 | 1.375E−03 | 1.14 | 51.53 | 633 |
| ULD12005 | 2.690E−04 | 1.719E−03 | 0.84 | 56.14 | 670 |
| ULD12005 | 2.690E−04 | 1.375E−03 | 0.79 | 56.93 | 676 |
| ULD12005 | 0.000E+00 | 1.719E−03 | 1.16 | 38.79 | 554 |
| ULD12005 | 0.000E+00 | 1.375E−03 | 1.12 | 39.74 | 560 |
| AIXR11004 | 0.000E+00 | 0.000E+00 | 9.55 | 1.11 | 335 |
| AIXR11004 | 2.152E−04 | 0.000E+00 | 4.82 | 22.84 | 456 |
| AIXR11004 | 1.345E−04 | 1.719E−03 | 2.72 | 17.85 | 461 |
| AIXR11004 | 1.345E−04 | 1.375E−03 | 4.11 | 15.99 | 420 |
| AIXR11004 | 1.681E−04 | 1.719E−03 | 3.76 | 14.68 | 419 |
| AIXR11004 | 1.681E−04 | 1.375E−03 | 4.26 | 16.02 | 419 |
| AIXR11004 | 2.018E−04 | 1.719E−03 | 3.23 | 19.71 | 442 |
| AIXR11004 | 2.018E−04 | 1.375E−03 | 4.97 | 6.74 | 386 |
| AIXR11004 | 2.690E−04 | 1.719E−03 | 3.19 | 19.20 | 446 |
| AIXR11004 | 2.690E−04 | 1.375E−03 | 4.39 | 9.75 | 404 |
| AIXR11004 | 0.000E+00 | 1.719E−03 | 3.21 | 6.06 | 400 |
| AIXR11004 | 0.000E+00 | 1.375E−03 | 3.29 | 5.79 | 401 |
| XR11003 | 0.000E+00 | 0.000E+00 | 34.63 | 0.00 | 187 |
| XR11003 | 2.152E−04 | 0.000E+00 | 20.41 | 2.23 | 264 |
| XR11003 | 1.345E−04 | 1.719E−03 | 23.08 | 0.02 | 225 |
| XR11003 | 1.345E−04 | 1.375E−03 | 28.54 | 0.04 | 208 |
| XR11003 | 1.681E−04 | 1.719E−03 | 26.68 | 0.20 | 221 |
| XR11003 | 1.681E−04 | 1.375E−03 | 28.56 | 0.03 | 208 |
| XR11003 | 2.018E−04 | 1.719E−03 | 25.94 | 0.22 | 223 |
| XR11003 | 2.018E−04 | 1.375E−03 | 26.60 | 0.24 | 221 |
| XR11003 | 2.690E−04 | 1.719E−03 | 23.42 | 0.38 | 239 |
| XR11003 | 2.690E−04 | 1.375E−03 | 24.84 | 0.25 | 230 |
| XR11003 | 0.000E+00 | 1.719E−03 | 24.87 | 0.00 | 210 |
| XR11003 | 0.000E+00 | 1.375E−03 | 26.13 | 0.00 | 208 |

Table 5 demonstrates that the drift reduction adjuvant compositions of guar gum and MSO DRT disclosed herein can be used efficaciously with a variety of nozzles. For example, Table 5 demonstrates that drift reduction adjuvant compositions of guar gum in combination with MSO DRT produced efficacious agricultural sprays that resulted in fewer fine droplets and either reduced, maintained or increased the number of ultra-coarse droplets compared to an agricultural spray of the pesticide without the adjuvant delivered from the same nozzle.

Table 5 demonstrates that the reduction of the fine droplets using the drift reduction adjuvant compositions of guar gum and MSO DRT depends on the nozzle. For example, Table 5 demonstrates that using the nozzle AI11003 to spray the agricultural sprays that included the drift reduction adjuvant compositions reduced the number of fine droplets by at least 38% compared to an agricultural spray of the pesticide without the drift reduction adjuvant compositions delivered from the nozzle AI11003. In fact, most of the agricultural sprays that included the drift reduction adjuvant compositions sprayed from the nozzle AI11003 reduced the number of fine droplets by at least 60% compared to an agricultural spray of the pesticide without the drift reduction adjuvant compositions delivered from the nozzle AI11003. It is also noted that using the nozzle AI11003 to spray agricultural sprays that included the drift reduction adjuvant compositions reduced the number of fine droplets compared to the agricultural spray of the pesticide that did not includes the MSO DRT. In another example, Table 5 demonstrates that using the nozzle TTI11004 to spray agricultural sprays that included the drift reduction adjuvant compositions reduced the number of fine droplets by at least 9% compared to an agricultural spray of the pesticide without the drift reduction adjuvant compositions delivered from the nozzle TTI11004. In another example, Table 5 demonstrates that using the nozzle ULD12005 to spray agricultural sprays that includes the drift reduction adjuvant composition reduced the number of fine droplets by at least 40% compared to an agricultural spray of the pesticide without the drift reduction adjuvant composition's delivered from the nozzle ULD12005. It is also noted that using the nozzle AI11003 to spray the agricultural sprays that includes the drift reduction adjuvant compositions can reduce the number of fine droplets compared to the agricultural spray of the pesticide that did not include the MSO DRT. In another example, Table 5 demonstrates that using the nozzle AIX11004 to spray agricultural sprays that included the drift reduction adjuvant compositions reduces the number of fine droplets by at least 48% compared to an agricultural spray of the pesticide without the drift reduction adjuvant compositions delivered from the nozzle AIXR11004. It is also noted that using the nozzle AIX11004 to spray the agricultural sprays that included the drift reduction adjuvant compositions can reduce the number of fine droplets compared to an agricultural spray of the pesticide that did not includes the MSO DRT. In another example, Table 5 demonstrates that using the nozzle XR11003 to spray agricultural sprays that included the drift reduction adjuvant compositions reduced the number of fine droplets by at least 18% compared to an agricultural spray of the pesticide without the drift reduction adjuvant compositions delivered from the nozzle AIXR11004.

Table 5 also demonstrates that spraying agricultural sprays that included each of the drift reduction adjuvant compositions of guar gum in combination with MSO DRT from each of the nozzles reduced the number of ultra-coarse droplets compared to agricultural sprays of the pesticide that did not include the MSO DRT.

It is believed that combinations of guar gum and MSO DRT at broader ranges than the ranges shown in Table 5, such as guar gum at $0.7\times10^{-4}$ to $5.2\times10^{-4}$ g/ml in combination with MSO DRT at $1\times10^{-4}$ to $3\times10^{-3}$ g/ml may provide efficacious agricultural sprays that reduce fines and managed the level of ultra-coarse droplets compared to an agricultural spray of the pesticide without the drift reduction adjuvant composition delivered from the same nozzle.

Study 6:

The droplet spectrum of dicamba with glyphosate, or dicamba alone, with two different adjuvants were assessed on a volume basis to identify the extent of the effects of the aforementioned combination on the reduction of fines and management of ultra-coarse droplets. A first adjuvant included a drift reduction adjuvant composition that included guar gum ($1.681\times10^{-4}$ g/ml of the total agricultural spray) in combination with MSO DRT ($1.719\times10^{-3}$ g/ml of the total agricultural spray). A second adjuvant included Halt™ DRT adjuvant ($1.225\times10^{-3}$ g/ml of the total agricultural spray).

It is noted that the label of the Halt™ DRT adjuvant stated that the adjuvant included guar gum. However, the inventors found it impossible to produce a drift reduction adjuvant composition that included guar gum from the Halt™ DRT adjuvant for several reasons. First, the label of the Halt™ DRT adjuvant did not disclose the amount of guar gum that would make the Halt™ DRT adjuvant effective. Additionally, a chemical analysis of the Halt™ DRT adjuvant proved that the Halt™ DRT adjuvant was a lecithin-based adjuvant and did not include guar gum. The chemical analysis of the Halt™ DRT adjuvant is supported by the Safety Data Sheet of the Halt™ DRT adjuvant which also listed the Halt™ DRT adjuvant as a lecithin-based adjuvant that does not include guar gum.

Materials and Methods: All testing was conducted within a recirculating low-speed wind tunnel (described in U.S. Pat. Nos. 8,689,619 and 9,116,068) using the approach described in Study 1. All testing was conducted using a TTI11004 nozzle.

Results: Table 6 provides the droplet spectrum results of spraying dicamba with glyphosate, or dicamba alone, in combination with the two different adjuvants to identify the extent of the effects of the aforementioned combination on the reduction of fines and management of ultra-coarse droplets.

TABLE 6

DRT Adjuvant sprays of guar gum in combination with MSO DRT vs. Halt ™ DRT adjuvant

| Herbicide | Guar Gum g/mL | MSO DRT g/mL | Halt ™ DRT Adjuvant g/mL | % Spray Vol. <150 um | % Spray Vol. >622 um | Vol. Median Diam (Dv50) |
|---|---|---|---|---|---|---|
| Dicamba (Control) | 0.000E+00 | 0.000E+00 | 0.000E+00 | 0.88 | 61.69 | 728 |
| Dicamba | 1.681E−04 | 1.719E−03 | 0.000E+00 | 0.59 | 68.33 | 776 |
| Dicamba | 0.000E+00 | 0.000E+00 | 1.225E−03 | 1.88 | 32.02 | 514 |
| Dicamba + Glyphosate (Control) | 0.000E+00 | 0.000E+00 | 0.000E+00 | 1.12 | 54.02 | 657 |
| Dicamba + Glyphosate | 1.681E−04 | 1.719E−03 | 0.000E+00 | 0.84 | 61.05 | 711 |
| Dicamba + Glyphosate | 0.000E+00 | 0.000E+00 | 1.225E−03 | 1.44 | 41.24 | 562 |

As reflected in Table 6, drift reduction adjuvant compositions of guar gum in combination with MSO DRT produces efficacious agricultural sprays that resulted in fewer fine droplets and managed the number of ultra-coarse droplets compared to an agricultural spray of the pesticide without the drift reduction adjuvant composition delivered from the same nozzle. Meanwhile, the Halt™ DRT adjuvant increased the number of fine droplets while decreasing the number of ultra-coarse droplets compared to the agricultural spray of the pesticide without the Halt™ DRT adjuvant delivered from the same nozzle. As such, using the Halt™ DRT adjuvant would result in more fines than the drift reduction adjuvant compositions of guar gum in combination with MSO DRT.

Although Table 6 only compares the Halt™ DRT adjuvant with a single composition of the drift reduction adjuvant compositions that include guar gum in combination with MSO DRT, it is believed that any of the drift reduction adjuvant compositions disclosed therein similarly reduce the number of fine droplets compared to the Halt™ DRT adjuvant.

While the present disclosure has been particularly shown and described with reference to embodiments thereof, it will be understood by those skilled in the art that various other changes in the form and details may be made without departing from the spirit and scope of the disclosure.

What is claimed is:

1. An agricultural spray, comprising:

a drift reduction adjuvant composition, the drift reduction adjuvant composition comprising:

water;

guar gum present in an amount of about 0.009 to about 0.020% (v/v) of the agricultural spray;

an emulsifier comprising a polyoxyethylene sorbitan emulsifier, the emulsifier present in an amount of 0.1 to 3.0% (v/v) of the drift reduction adjuvant composition; and methylated soybean oil present in an amount of about 0.078 to about 0.391% (v/v) of the agricultural spray, and a pesticide, wherein the adjuvant composition is free of lecithin.

2. The agricultural spray of claim 1, wherein the polyoxyethylene sorbitan emulsifier comprises one or more of:

polyoxyethylene sorbitan fatty acid ester, polyoxyethylene 20 sorbital trioleate, polyoxyethylene sorbitan mixed fatty acid ester, polyoxyethylene sorbitan monolaurate, polyoxyethylene sorbitan monooleate, polyoxyethylene sorbitan monopalmitate, polyoxyethylene sorbitan monostearate, polyoxyethylene sorbitan monotallate, polyoxyethylene sorbitol hexaoleate, polyoxyethylene sorbitol oleate-laurate, polyoxyethylene sorbitol penta tall oil ester (40 moles), polyoxyethylene sorbitol tetraoleate, or polyoxyethylene sorbitol, mixed ethyl ester.

3. The agricultural spray of claim 1, wherein the guar gum forms about 0.012 to about 0.020% (v/v) of the agricultural spray.

4. The agricultural spray of claim 1, wherein the methylated soybean oil forms about 0.156 to about 0.313% (v/v) of the agricultural spray.

5. The agricultural spray of claim 1, wherein the polyoxyethylene sorbitan emulsifier forms up to about 3.2% (v/v) of the drift reduction adjuvant composition.

6. An agricultural spray, comprising:

a drift reduction adjuvant composition, the drift reduction adjuvant composition comprising:

water;

guar gum present in an amount of about $1.18\times10^{-4}$ to about $1.35\times10^{-4}$ g/ml of the agricultural spray;

an emulsifier comprising a polyoxyethylene sorbitan fatty acid ester, the emulsifier present in an amount of 0.1 to 3.0% (v/v) of the drift reduction adjuvant composition; and methylated soybean oil present in an amount of about 0.12 to about 0.23% (v/v) of the agricultural spray; and a pesticide, wherein the agricultural spray produces fewer droplets less than 150 μm in diameter and either reduces, maintains or increases by up to 30 percentage points the number of ultra-coarse droplets above 622 μm in diameter when delivered from an agricultural nozzle compared to an agricultural spray of the pesticide without the drift reduction adjuvant composition sprayed under the same conditions, and wherein the adjuvant composition is free of lecithin.

7. The agricultural spray of claim 6, wherein the agricultural nozzle is configured to produce a flat fan spray.

8. The agricultural spray of claim 6, wherein a pH of the spray is about 5 to about 7.

9. The agricultural spray of claim 6, wherein the emulsifier forms up to about 0.04% (v/v) of the spray.

10. The agricultural spray of claim 6, wherein the pesticide comprises dicamba.

11. The agricultural spray of claim 6, wherein the agricultural spray either reduces, maintains or increases by up to 15 percentage points the number of ultra-coarse droplets above 622 μm in diameter when delivered from the agricultural nozzle compared to an agricultural spray of the pesticide without the drift reduction adjuvant composition sprayed under the same conditions.

12. The agricultural spray of claim 1, wherein the drift reduction adjuvant composition is free of water conditioning agents.

13. The agricultural spray of claim 1, wherein the pesticide comprises dicamba or dicamba with glyphosate.

* * * * *